3,219,695
HEXA-HALO-BICYCLO[2.2.1]HEPT-5-ENE-2,3-BIS UREAS

Paul E. Hoch, Youngstown, N.Y., assignor to Hooker Chemical Corporation, Niagara Falls, N.Y., a corporation of New York
No Drawing. Filed May 19, 1964, Ser. No. 368,739
7 Claims. (Cl. 260—553)

This is a continuation-in-part of application Serial No. 220,024, filed August 28, 1962, now Patent No. 3,158,-638, which is a continuation-in-part of application Serial No. 838,046, filed September 4, 1959, now Patent No. 3,151,143.

This invention relates to compositions of matter known as polyhalogen containing, bicyclic ureas, wherein the halogen is selected from the group consisting of chlorine, bromine, fluorine, and mixtures thereof.

The compositions of the present invention find utility in many applications, for example, in agricultural applications and in the preparation of polymeric materials which are flame retardant. Thus the ureas can be reacted with formaldehyde to form fire-resistant urea-aldehyde-type resins. The ureas can also be incorporated as additives in polymeric compositions such as the polyurethanes to render them fire resistant.

The compounds of the invention are represented by the following general formula:

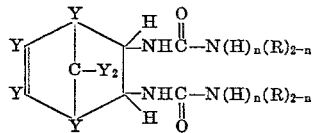

wherein Y can be fluorine, chlorine, bromine, or mixtures thereof, R represents alkyl, aryl, substituted alkyl or substituted aryl as will be pointed out with greater particularity hereinafter, and $n$ can be an integer from 0 to 1.

The polyhalogenated, bycyclic ureas can be prepared from the corresponding polyhalogenated, bicyclic diisocyanates. The latter compounds are prepared by reacting a polyhalogenated, bicyclic acid chloride, for example, 3,4,5,6,7,7-hexachloro - 3,6-methano-1,2,3,6-tetrahydrophthaloyl chloride with at least two moles of an alkali metal azide to form a diazide, which upon heating forms the desired diisocyanate, for example, 3,4,5,6,7,7-hexachloro - 3,6-endomethylene - 1,2,3,6-tetrahydrobenzene-1,2-diisocyanate. Any alkali metal azide can be employed, for example, sodium, potassium, cesium, lithium, etc. The organic diazide can be decomposed at temperatures, in the range of about 60 to about 90 degrees centigrade. The starting material can also be fluoro- or bromo-substituted. Alternatively mixed chloro-, fluoro-, or bromo-substituted compounds can be employed. Useful materials can also be obtained by substituting some of the halogens with alkoxy groups. The following are additional examples of the diisocyanate starting materials that can be used in preparing the ureas of the invention: 3,4,5,6,7,7-hexabromo-3,6-endomethylene - 1,2,3,6-tetrahydrobenzene - 1,2-diisocyanate, 3,4,5,6-tetrachloro-7,7-difluoro - 3,6 - endomethylene-1,2, 3,6-tetrahydrobenzene - 1,2 - diisocyanate, 3,4,5,6 - tetrachloro-7,7-dibromo - 3,6 - endomethylene-1,2,3,6-tetrahydrobenzene-1,2-diisocyanate, 3,4,5,6,7 - pentachloro - 3,6-endomethylene - 1,2,3,6 - tetrahydrobenzene - 1,2 - diisocyanate, 3,4,5,6-tetrachloro - 3,6-endomethylene-1,2,3,6-tetrahydrobenzene - 1,2-diisocyanate, and 3,4,5,6-tetrachloro - 7,7-dimethoxy-3,6-endomethylene - 1,2,3,6-tetrahydrobenzene-1,2-diisocyanate.

The ureas of the invention can be prepared from the thus described diisocyanates in accordance with the following equation given for the purpose of illustration.

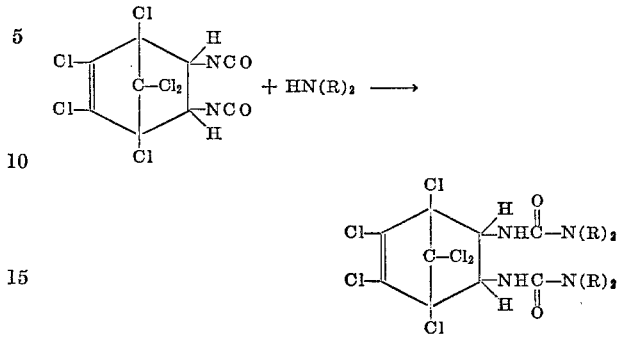

wherein R can be aliphatic or aromatic. In addition a primary amine may be employed instead of a secondary amine, i.e., a compound having the formula

Generally the alkyl groups have one to twenty carbon atoms, preferably one to twelve. Generally, the aryl groups have six to twenty carbon atoms, more usually six to fourteen.

Typical amines are methylamine, ethylamine, propylamine, isopropylamine, amylamine, dodecylamine, eicosylamine, cyclohexylamine, benzylamine, 2-chloroethylamine, aniline, para-chloroaniline, amino-napthalene, aminoanthracene, dimethylamine, dibutylamine, diamylamine, diphenylamine, di-2-chloroethylamine, and di(chlorophenyl) amine and the like.

The reaction proceeds by admixing the desired reactants preferably in the presence of an inert solvent for the reactants, such as ether. Since the reaction is exothermic, the reaction mixture is cooled, for example, by refluxing. The product is recovered by phase separation, e.g., filtration, evaporation of the solvent and the like, and further by solvent washing and recrystallization, if desired.

The following examples further illustrate the invention, but are not intended to limit it. All parts are by weight and temperatures in degrees centigrade unless indicated otherwise.

*Example 1.—Preparation of 3,4,5,6,7,7 - hexachloro-3,6 - endomethylene - 1,2,3,6 - tetrahydrobenzene-1,2-diisocyanate*

A suspension of 180 cubic centimeters dry chlorobenzene and 12.7 grams (0.196 mole) of sodium azide (activated previously with hydrazine and reprecipitated in actone before use) was treated with 38 grams (0.089 mole) of 3,4,5,6,7,7 - hexachloro - 3,6 - methano-1,2,3,6-tetrahydrophthaloyl chloride. The suspension developed an exotherm and the temperature rose from 28 to 40 degrees centigrade in 15 minutes. Heat was then applied and the temperature was raised to 71 degrees centigrade at which point gas evolution was observed and a second exotherm took place. The temperature rose to 86 degrees centigrade and cooling was employed. The suspension was maintained at a temperature of from about 64 to 77 degrees centigrade for 35 minutes, bringing the total reaction time to 2 hours and 40 minutes. The suspension was cooled to 25 degrees centigrade and filtered. The filtrate was evaporated under vacuum on a steam cone. The residue, weighing thirty grams, was the excepted product.

*Analysis.*—Calculated for $C_9H_2Cl_6N_2O_2$: Cl, 55.6 percent. Found: 55.49 percent.

*Example 2.*—*Preparation a urea derivative, N,N'-bis(isopropylcarbamoyl) [3,4,5,6,7,7 - hexachloro - 3,6-endomethylene - 1,2,3,6 - tetrahydrobenzene - 1,2 - diamine]*

A solution of 7.6 grams of the product of Example 1 in 50 cubic centimeter of dry ether was treated with 5.05 grams of isopropyl amine in 50 cubic centimeters of ether. An exothermic reaction took place and a solid separated. The white solid weighing 4.6 grams was washed with ether. This material was recrystallized from benzene several times yielding N,N' - bis(isopropylcarbamoyl) [3,4,5,6,7,7 - hexachloro - 3,6 - endomethylene - 1,2,3,6-tetrahydrobenzene - 1,2 - diamine] which had a melting point of 191 to 192 degrees centigrade with decomposition.

*Analysis.*—Calculated for $C_{21}H_{32}Cl_6O_2N_4$: Cl 36.4 percent; N, 9.58 percent. Found: Cl, 36.6 percent; N, 9.3 percent.

*Example 3.*—*Preparation of a urea derivative, N,N'-bis(diethylcarbamoyl) [3,4,5,6,7,7 - hexabromo - 3,6 - endomethylene - 1,2,3,6 - tetrahydrobenzene - 1,2 - diamine]*

Using the method employed in Example 2, 6 grams of diethylamine are reacted with a solution containing 5 grams of 3,4,5,6,7,7 - hexabromo - 3,6 - endomethylene-1,2,3,6 - tetrahydrobenzene - 1,2 - diisocyanate to produce N,N' - bis(diethylcarbamoyl) [3,4,5,6,7,7 - hexabromo-3,6-endomethylene - 1,2,3,6 - tetrahydrobenzene - 1,2 - diamine].

*Example 4.*—*Preparation of urea derivative, N,N'-bis(phenylcarbamoyl) [3,4,5,6 - tetrachloro - 7,7 - difluoro-3,6 - endomethylene - 1,2,3,6 - tetrahydrobenzene-1,2-diamine]*

Using the procedure of Example 2, 10 grams of aniline are reacted with an ether solution containing 5 grams of 3,4,5,6 - tetrachloro - 7,7 - difluoro - 3,6 - endomethylene - 1,2,3,6 - tetrahydrobenzene - 1,2 - diisocyanate to produce N,N' - bis(phenylcarbamoyl) [3,4,5,6 - tetrachloro - 7,7 - difluoro - 3,6 - endomethylene-1,2,3,6-tetrahydrobenzene-1,2-diamine].

This invention may be embodied in other forms or carried out in other ways without departing from the spirit or essential characteristics thereof. The present embodiment is therefore to be considered as in all respects illustrative and not restrictive.

I claim:

1. A compound having the formula:

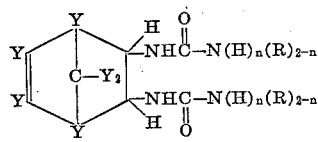

wherein each Y is selected from the group consisting of fluorine, chlorine, and bromine; R is selected from the group consisting of alkyl of one to twenty carbon atoms, chloroalkyl of one to twenty carbon atoms, cyclohexyl, phenyl, chlorophenyl, benzyl, naphthyl and anthracyl; and n is an integer from 0 to 1.

2. A compound having the formula:

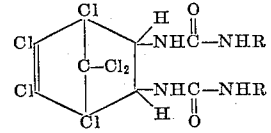

wherein R is alkyl of one to twelve carbon atoms.

3. A compound having the formula:

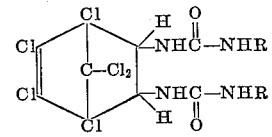

wherein R is cyclohexyl.

4. A compound having the formula:

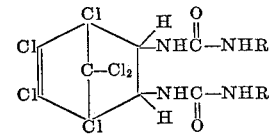

wherein R is phenyl.

5. A compound having the formula:

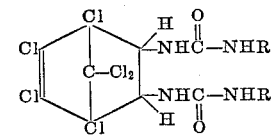

wherein R is chlorophenyl.

6. A compound having the formula:

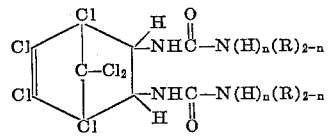

wherein R is alkyl of one to twelve carbon atoms, and n is a member of the group consisting of 0 and 1.

7. N,N' - bis(isopropyl carbamoyl) [3,4,5,6,7,7 - hexachloro - 3,6 - endomethylene - 1,2,3,6 - tetrahydrobenzene-1,2-diamine].

References Cited by the Examiner

Pinner: Plastics (London), pages 206–11.

NICHOLAS S. RIZZO, *Primary Examiner.*